(12) United States Patent
Riefe et al.

(10) Patent No.: US 7,137,499 B2
(45) Date of Patent: Nov. 21, 2006

(54) STEERING COLUMN MOUNTED POWER TRANSMISSION SHIFTER

(75) Inventors: Richard K. Riefe, Saginaw, MI (US); Tamara J. Reppuhn, Hemlock, MI (US); Michael C. Vermeersch, Saginaw, MI (US); David M. Byers, Saginaw, MI (US); Ravindra Jwalapathy, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 187 days.

(21) Appl. No.: 10/887,410

(22) Filed: Jul. 8, 2004

(65) Prior Publication Data

US 2006/0005646 A1  Jan. 12, 2006

(51) Int. Cl.
*B60W 10/10* (2006.01)
*F16H 59/04* (2006.01)

(52) U.S. Cl. .............. 192/220.2; 74/473.12; 180/336

(58) Field of Classification Search .......... 192/220.2
See application file for complete search history.

(56) References Cited

U.S. PATENT DOCUMENTS

| | | | |
|---|---|---|---|
| 2,236,746 A | 4/1941 | Bush | |
| 2,284,246 A * | 5/1942 | Baade | ............ 74/335 |
| 2,610,518 A | 9/1952 | Goedeke et al. | |
| 2,658,403 A | 11/1953 | Marco | |
| 2,788,675 A | 4/1957 | Hosea | |
| 2,902,881 A | 9/1959 | Loofbourrow | |
| 3,001,618 A | 9/1961 | McCordic et al. | |
| 3,125,893 A | 3/1964 | Bensinger | |
| 3,448,640 A | 6/1969 | Nelson | |
| 4,354,396 A * | 10/1982 | Charles | ............ 74/104 |
| 4,664,217 A | 5/1987 | Welch et al. | |
| 4,790,204 A | 12/1988 | Tury et al. | |
| 4,817,471 A | 4/1989 | Tury | |
| 4,843,901 A | 7/1989 | Peterson et al. | |
| 4,922,769 A | 5/1990 | Tury | |
| 4,998,444 A | 3/1991 | Mabee | |
| 5,085,106 A | 2/1992 | Bubnash | |
| RE34,064 E | 9/1992 | Tury et al. | |
| 5,758,304 A | 5/1998 | Bray | |
| 6,196,078 B1 | 3/2001 | DeJonge | |
| 6,487,484 B1 * | 11/2002 | Shober et al. | ............ 701/51 |
| 2004/0139815 A1* | 7/2004 | Shimamura et al. | ........ 74/335 |
| 2004/0211283 A1* | 10/2004 | Ogasawara et al. | ...... 74/473.12 |
| 2004/0216549 A1* | 11/2004 | Shiomi et al. | ........... 74/473.12 |
| 2005/0274217 A1* | 12/2005 | Dubay et al. | ............ 74/473.12 |

\* cited by examiner

*Primary Examiner*—Rodney H. Bonck
(74) *Attorney, Agent, or Firm*—Michael D. Smith

(57) ABSTRACT

The invention provides an apparatus for shifting an automatic transmission having a shift position select lever. The invention selectively shifts the transmission to one of a plurality of different transmission shift positions. The invention includes a steering column positionable in a passenger compartment of a vehicle. A switch is mountable in the passenger compartment of the vehicle and operable to emit a first signal representative of a desired change with respect to a transmission shift position. A motor generates a moving force and a linkage associated with the motor to transmit the moving force from the motor to a shift lever of a transmission of the vehicle. A sensor is responsive to a current transmission shift position and emits a second signal corresponding to the sensed current transmission shift position. A controller is responsive to the switch and to the sensor. The controller selectively controls the motor to engage in response to the first and second signals received from the switch and the sensor, respectively. The motor is mounted on the steering column of the vehicle.

29 Claims, 8 Drawing Sheets

STEERING COLUMN MOUNTED POWER TRANSMISSION SHIFTER

FIELD OF THE INVENTION

The invention relates to an apparatus for shifting a transmission and more particularly the invention provides an electronic transmission shifter.

BACKGROUND OF THE INVENTION

Current technology uses a steering column mounted mechanical device to move an automatic transmission through gears. The transmission can be moved among a plurality of different transmission shift positions, such as park, reverse, neutral and drive. U.S. Pat. No. 6,487,484 discloses a shifting apparatus for an automatic transmission that is adapted to provide installation flexibility where space is limited within the motor vehicle. The apparatus includes a keypad module that is mounted on the instrument panel of a vehicle and a motor that communicates with the keypad module. When the motor is engaged a motor drive module moves a cable to adjust the transmission shift position. The motor is installed on the trunk or under the seat of a vehicle, where space is available and access is easy.

SUMMARY OF THE INVENTION AND ADVANTAGES

The present invention provides an apparatus for shifting an automatic transmission having a shift position select lever and selectively shifts the transmission to one of a plurality of different transmission shift positions with a motor mounted on a steering column of a vehicle. The steering column is positionable in a passenger compartment of the vehicle. A switch is mountable in the passenger compartment of the vehicle and operable to emit a first signal representative of a desired change with respect to a transmission shift position. The motor generates a moving force and a linkage associated with the motor to transmit the moving force from the motor to a shift lever of a transmission of the vehicle. A sensor is responsive to a current transmission shift position and emits a second signal corresponding to the sensed current transmission shift position. A controller is responsive to the switch and to the sensor. The controller selectively controls the motor to engage in response to the first and second signals received from the switch and the sensor, respectively.

The present invention provides advantages over the prior art in that mounting the motor to the steering column minimizes the distance between the motor and the transmission selector lever and minimizes the complexity of the linkage between the motor and the transmission. Also, the present invention provides enhanced safety over the prior art in that the motor will move with the steering column in the event of a vehicle crash. In addition, the connection between the motor and the steering column can be substantially more rigid than a connection between the motor and a vehicle seat. The invention can also include a force multiplier to provide a significant mechanical advantage. In particular, a relatively small motor can actuate the transmission of the vehicle in all conditions, such as moving the transmission out of park when the vehicle is parked on a hill.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
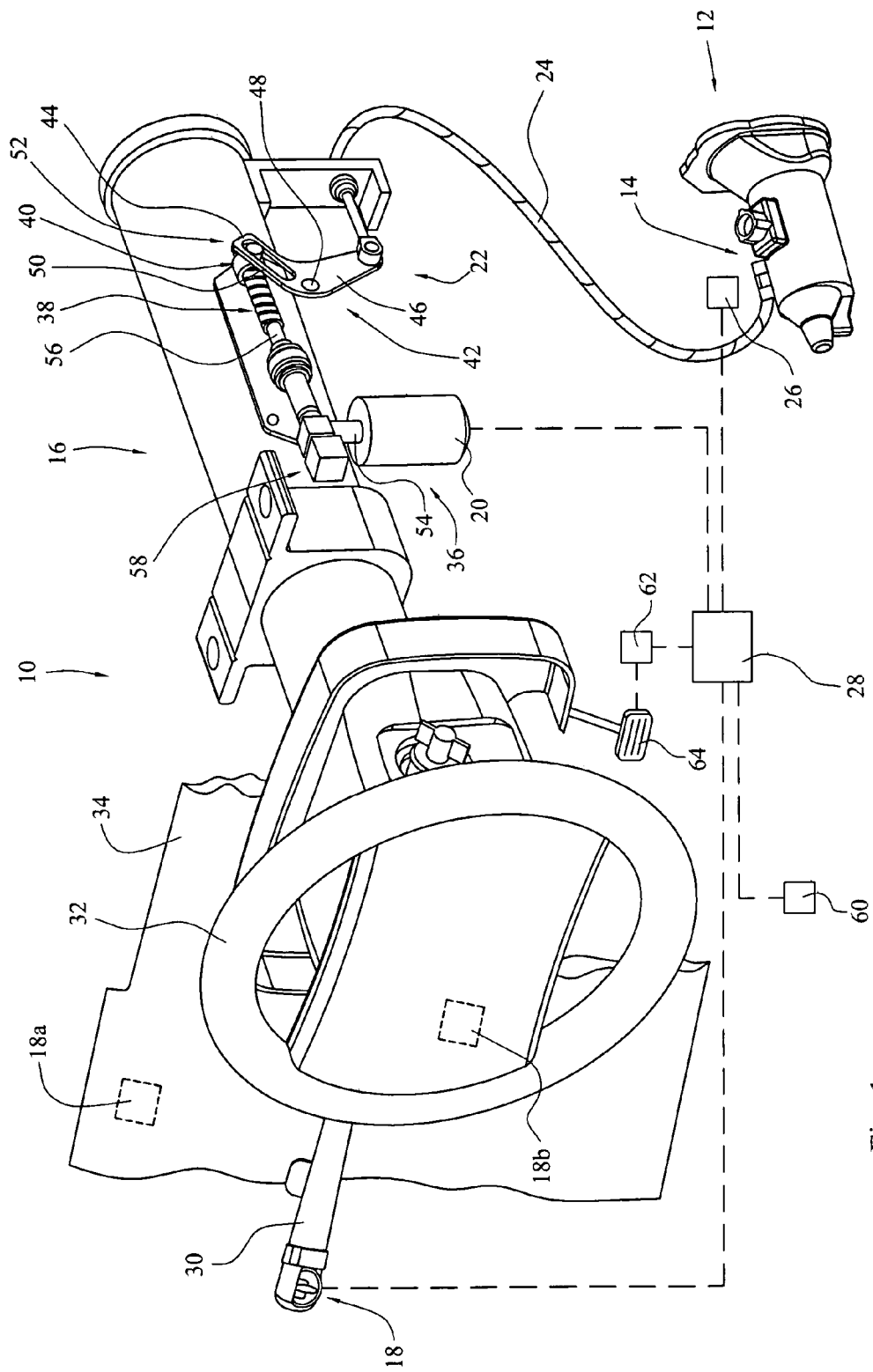
FIG. 1 is a perspective view of a first exemplary embodiment of the invention.

Referring now to FIG. 1, in a first exemplary embodiment of the invention, an apparatus 10 shifts an automatic transmission 12 having a shift position select lever 14, to selectively shift the transmission 12 to one of a plurality of different transmission shift positions. The transmission shift positions include at least park, neutral, reverse, and drive. The apparatus 10 includes a steering column 16 positionable in a passenger compartment of a vehicle. The steering column 16 can be a tilting steering column, a telescoping steering column, or a tilting and telescoping steering column.

The apparatus 10 also includes a switch 18 mountable in the passenger compartment of the vehicle and operable to emit a first signal representative of a desired change with respect to the transmission shift position. The driver of the vehicle can engage the switch 18 to signal a desire to change the transmission shift position, for example from park to drive. In the first exemplary embodiment of the invention, a lever arm 30 extends from the steering column 16 and the switch 18 is disposed on the lever arm 30. The lever arm 30 could be a form engaging turn signals of the vehicle, windshield wipers of the vehicle, or a tilting movement lock lever. In an alternative embodiments of the invention, shown in phantom, a switch 18a can be disposed on an instrument panel 34 extending at least partially around the steering column 16. Alternatively, a switch 18b for emitting the first signal can be disposed on a steering wheel 32 associated with the steering column 16.

The switch 18 can be moveable in an up direction and a downward direction to signal a desired change in shift position of the transmission 12. Alternatively, the switch 18 can include a first switch that emits and "up" signal and a second switch that emits a "down" signal. In a fifth exemplary embodiment of the invention shown in FIG. 5, a switch similar to switch 18 in FIG. 1 can signal desired changes transition from the park shift position to a drive 1, or low 1 position, in the following order: PARK-REVERSE-NEUTRAL-OVERDRIVE-DRIVE3-DRIVE2-DRIVE1.

Referring again to FIG. 1, the apparatus 10 also includes a motor 20 to generate a moving force. As will be discussed in greater detail below, the motor 20 is engaged at least partially in response to the switch 18 emitting the first signal. The motor 20 is mounted on the steering column 16. Preferably, the motor 20 is a servo motor having a rotatable shaft 36. In the first exemplary embodiment, the shaft 36 includes first and second portions 54, 56 rotatably associated with one another through a gear assembly 58. The second portion 56 rotates in response to rotation of the first portion 54. The motor 20 can rotate the shaft 36 in first and second opposite directions to adjust the shift position in opposite directions. In alternative embodiments of the invention, the motor 20 could include a one-piece shaft.

The apparatus 10 also includes a linkage 22 associated with the motor 20 to transmit the moving force from the motor 20 to the shift lever 14 of the transmission 12. In the first exemplary embodiment of the invention, the linkage 22 includes a screw drive 38 defined on the second portion 56 of the shaft 36 and a nut 40 that moves in translation in response to rotation of the shaft 36. The linkage 22 also includes a link bar 42 having first and second ends 44, 46 and a pivot point 48 defined between the first and second ends 44, 46. The link bar 42 also includes a slot 50 defined between the first end 44 and the pivot point 48. At least a portion of the nut 40 is movably positioned in the slot 50 and the link bar 42 rotates in response to translation of the nut 40. The nut 40 and the link bar 42 are associated with one another in a cam-cam follower relationship.

The linkage 22 also includes a flexible cable 24. The flexible cable 24 is connected at one end to the second end 46 of the link bar 42 and at the other end to the position select lever 14. The flexible cable 24 includes a sleeve portion and a wire portion movable within the sleeve portion. Opposite ends of the sleeve portions are fixedly connected to the steering column 16 and to the transmission 12, respectively. In response to rotation of the link bar 42, the wire portion of the flexible cable 24 moves relative to the sleeve portion and moves the position select lever 14.

The linkage 22 defines a force multiplier 52 associated with the motor 20 to increase the moving force. Under certain operating conditions, the force required to shift the transmission can be relatively high. For example, one such operating condition occurs when a vehicle is parked on a sloped surface such as a hill. The force required to move the transmission out of park in such a situation is greater than the force required to move the transmission out of park when the vehicle is parked on a flat surface. The force multiplier 52 of the first exemplary embodiment of the invention allows the motor 20 to be sized smaller than a shifting mechanism without a force multiplier, such as disclosed in the prior art. The moving force generated by the motor 20 is transmitted through the shaft 36, screw drive 38, and nut 40 to rotate the link bar 42 about the pivot point 48. Translation of the nut 40, in response to the rotation of the shaft 36 of the motor 20, rotates the link bar 42 about the pivot point 48. The distance between the nut 40 and the pivot point 48 is less than the distance between the pivot point 48 and the connection between the flexible cable 24 and the second end 46. As result, the force transmitted from the second end 46 is multiplied, or, in other words, greater than the force transmitted to the first end 44.

The apparatus 10 also includes a sensor 26 responsive to a current transmission shift position for emitting a second signal. As will be discussed in greater detail below, the current transmission shift position is a factor for determining whether the motor 20 should be engaged to shift the transmission 12. The sensor 26 of the first exemplary embodiment is spaced from the motor 20, mounted adjacent to the transmission 12 to sense the current transmission shift position based on the position of the position select lever 14.

The apparatus 10 also includes a controller 28 responsive to the switch 18 and to the sensor 26, for selectively controlling the motor 20 to engage in response to the first and second signals. The controller 28 receives the first signal from the switch 18 and the second signal from the sensor 26. Based on programmable logic stored in memory, the controller 28 determines whether the motor 20 should be engaged to shift the transmission shift position. Preferably, the controller 28 will prevent shifting of the transmission 12 if shifting may cause damage to the transmission 12 or may create unsafe operating conditions for the vehicle.

For example, in a preferred embodiment of the invention, the controller 28 would not engage the motor 20 to shift the transmission 12 from drive directly to reverse. Furthermore, the controller 28 can communicate with other sensors associated with the vehicle to further enhance the safe operation of the vehicle. For example, the controller 28 can communicate with a vehicle speed sensor 60 disposed with respect to the vehicle to sense the velocity of the vehicle. The velocity is defined by a direction component and a speed component. The controller 28 can determine whether to change the transmission shift position in response, at least in part, to either or both components of the velocity of the vehicle. The second sensor 60 can communicate the sensed velocity to the controller 28. and, in a preferred embodiment of the invention, the controller 28 would not engage the motor 20 to shift the transmission 12 from drive to park if the vehicle is traveling at a predetermined speed. Thus, the controller 28 is operable to receive the first signal from the switch 18 corresponding to a desired change in the transmission shift position and maintain disengagement of the motor 20.

Figure 2:
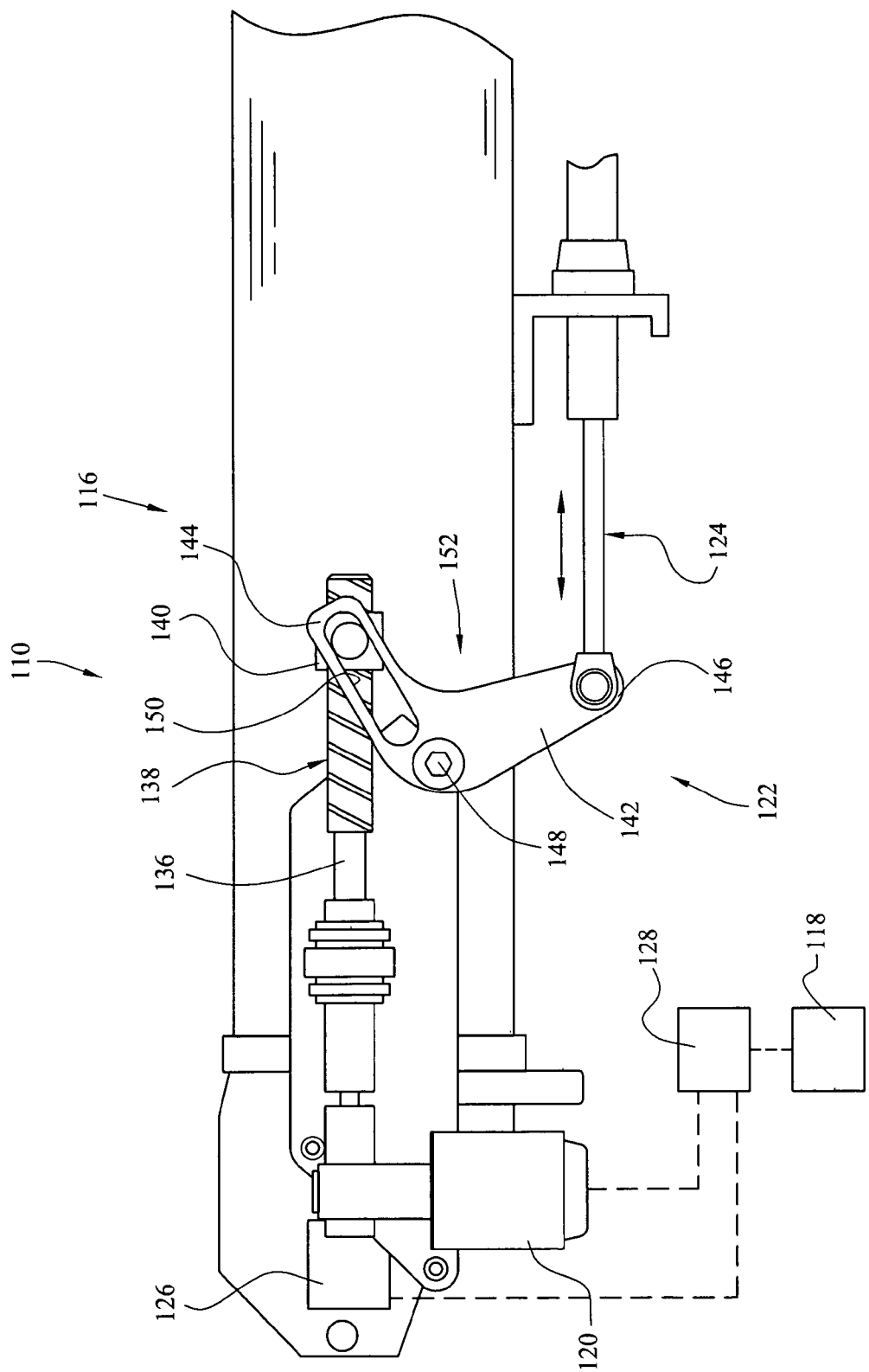
FIG. 2 is a side view showing a second exemplary embodiment of the invention.

Referring now to FIG. 2, in a second exemplary embodiment of the invention, an apparatus 110 includes a steering column 116, a switch 118, a motor 120, and a controller 128 that are substantially similar to the steering column 16, the switch 18, the motor 20, and the controller 28 of a first exemplary embodiment of the invention. The second exemplary embodiment of the invention is substantially a mirror image of the first exemplary embodiment of the invention. The motor 120 includes a rotatable shaft 136 and the apparatus 110 also includes a linkage 122 having a screw drive 138 defined on the shaft 136 and a nut 140. The nut 140 translates in response to rotation of the shaft 136. The linkage 122 also includes a link bar 142 having first and second ends 144, 146, a pivot point 148, and a slot 150. A flexible cable 124 extends from the second end 146 of the link bar 142 to a transmission of the vehicle. The cooperation between the link bar 142, the nut 140, and the flexible cable 124 define a force multiplier 152. The apparatus 110 also includes a sensor 126 that is operably associated with the motor 120. For example, the sensor 126 is disposed adjacent the motor 120 and senses the current transmission shift position based on the position of the shaft 136.

Figure 3:
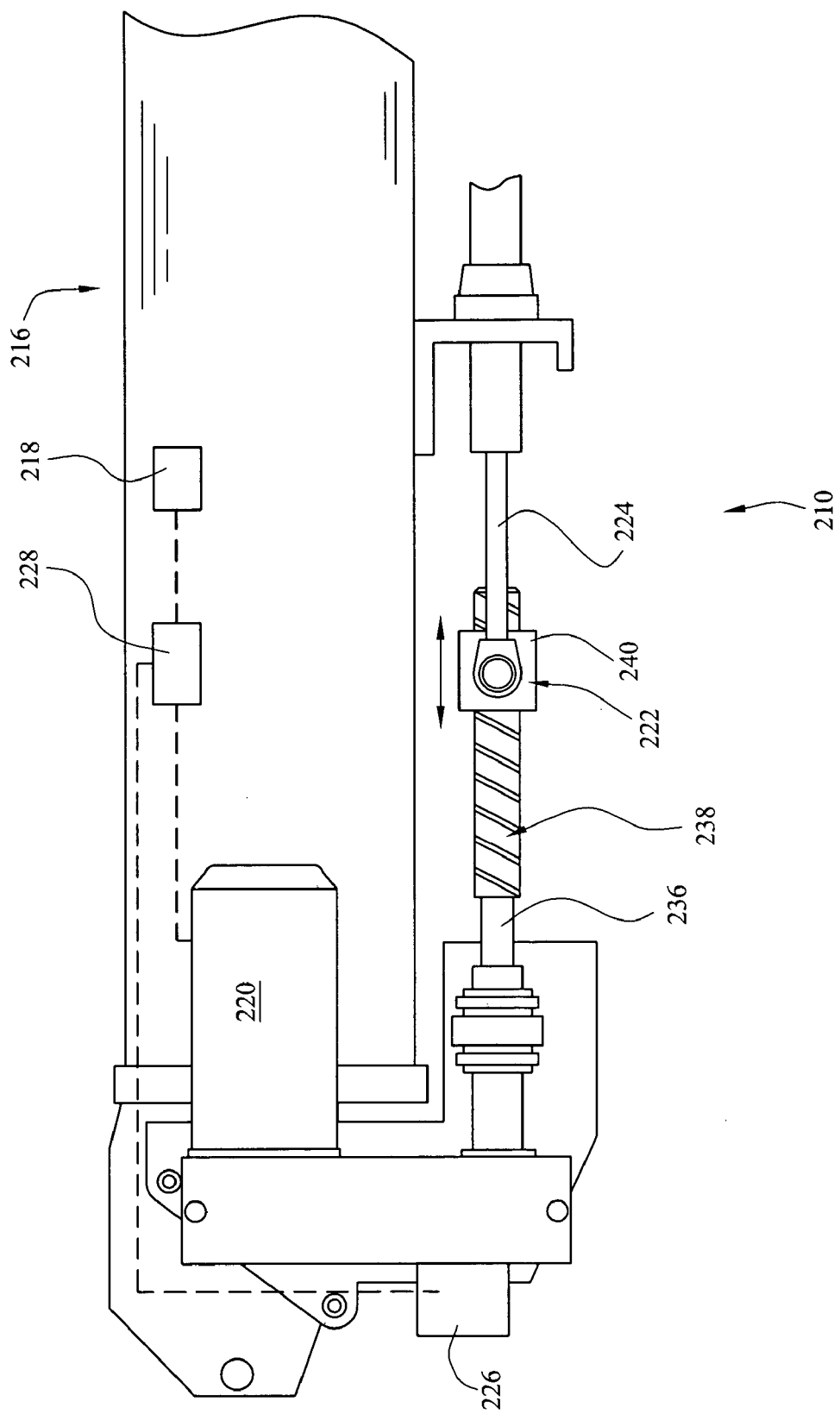
FIG. 3 is a side view of a third exemplary embodiment of the invention.

Referring now to FIG. 3 in a third exemplary embodiment of the invention, an apparatus 210 includes a steering column 216, a switch 218, a motor 220, and a controller 228 that are substantially similar to the steering column 16, switch 18, motor 20, and controller 28 of the first exemplary embodiment of the invention. The apparatus 210 also includes a sensor 226 that is substantially similar to the sensor 126 of the second embodiment of the present invention. The motor 220 includes a rotatable shaft 236 and the apparatus 210 includes a linkage 222 having a screw drive 238 defined on the shaft 236 and a nut 240. The nut 240 translates in response to rotation of the shaft 236. The linkage 222 also includes a flexible cable 224 and the nut 240 is directly connected to the flexible cable 224.

Figure 4:
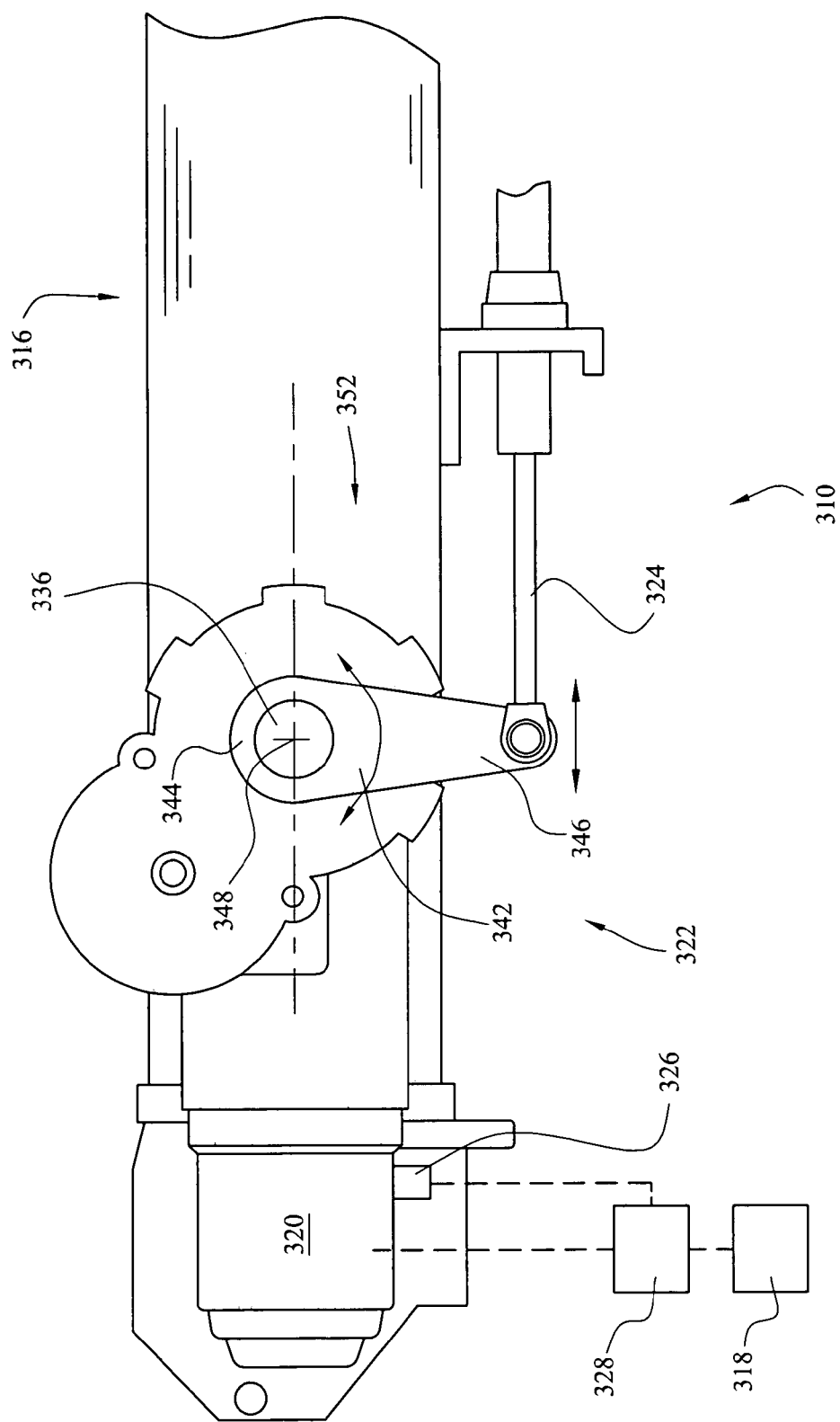
FIG. 4 is a side view of a fourth exemplary embodiment of the invention.

Referring now to FIG. 4, in a fourth exemplary embodiment of the invention, an apparatus 310 includes a steering column 316, a switch 318, a motor 320, and a controller 328 that are substantially similar to the steering column 16, the switch 18, the motor 20, and the controller 28 of the first exemplary embodiment of the invention. The apparatus 310 also includes a sensor 326 substantially similar to the sensor 126 of the second embodiment of the present invention. The apparatus 310 also includes a linkage 322 having a link bar 342 with first and second ends 344, 346 and a pivot point 348. The motor 320 directly rotates the link bar 342 about the pivot point 348 without a nut as shown in other embodiments of the invention. The linkage 322 also includes a flexible cable 324 connected to the second end 346 of the link bar 342. In response to rotation of the link bar 342 about the pivot point 348, the flexible cable 324 moves to adjust the transmission shift position.

Figure 5:
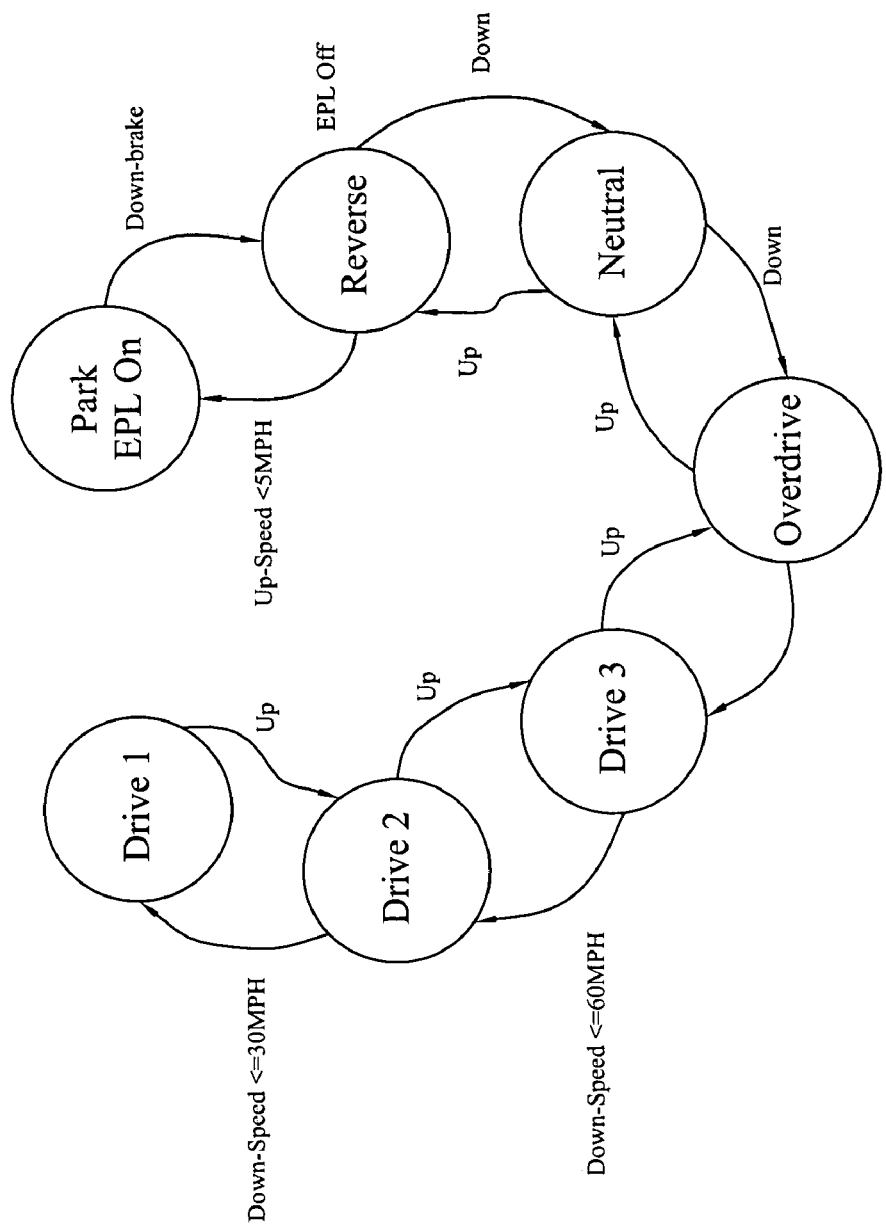
FIG. 5 is a schematic illustration of various shift positions that are definable by a transmission according to fifth exemplary embodiment of the invention.
Figure 7:
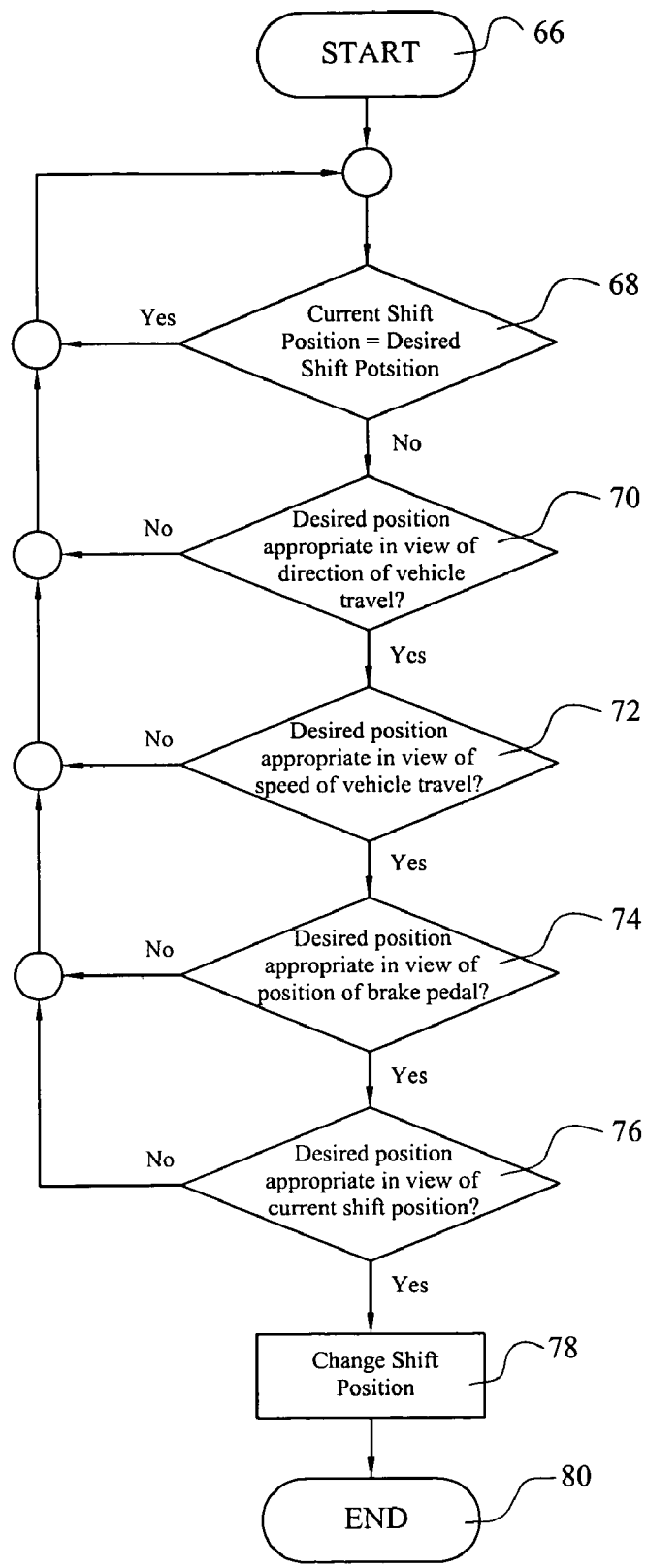
FIG. 7 is a simplified flow diagram illustrating the steps performable by a controller according to a seventh exemplary embodiment of the invention.

FIG. 7 is a simplified flow diagram of an exemplary process a controller according to an alternative embodiment of the invention can follow when determining whether to act on a signal from the switch 18. The process starts at step 66. At step 68, the controller determines whether the switch, similar to the switch 18 in FIG. 1, has emitted a signal corresponding to a desire to change the current shift position. When the signal is received from the switch, the process continues to step 70 and the controller determines whether the desired shift position change is appropriate in view of the direction of vehicle travel. For example, in a preferred embodiment of the invention, the controller will not emit a signal to engage the motor and shift the transmission to drive if the vehicle is moving in reverse. A desired switch from drive to reverse can be communicated by the driver by engaging the switch twice. Similarly, in a preferred embodiment of the invention, the controller will not emit a signal to engage the motor and shift the transmission to reverse if the vehicle is moving forward. If the desired change in shift position is appropriate in view of the direction of vehicle travel, the process continues to step 72 and the controller determines whether the desired shift position change is appropriate in view of the speed of vehicle travel. For example, as shown in FIG. 5, when the vehicle is moving at a speed greater than a certain speed such as five miles per hour the controller would not move the transmission shift position from reverse to park. Also, if the vehicle is moving at a speed greater than a certain speed such as thirty miles per hour, it may not be desirable to allow the driver to shift the vehicle into a Drive-1 shift position from the Drive-2 shift position. A summary of possible speed/shift considerations is given in Table 1 and shown in FIG. 5.

TABLE 1

Speed Checks to Determine Validity of Desired Gear Positions

| Current Gear | Next Desired | Previous Gear | Validity Check |
|---|---|---|---|
| X | PARK | X | No shift if speed > 5 mph |
| X | DRIVE1 | X | No shift if speed > 30 mph |
| X | DRIVE2 | X | No shift if speed > 60 mph |
| NEUTRAL | REVERSE | DRIVE | No shift if speed > 5 mph |
| NEUTRAL | DRIVE | REVERSE | No shift if speed > 5 mph |

If the desired change in shift position is appropriate in view of the speed of vehicle travel, the process continues to step 74 and the controller determines whether the desired shift position change is appropriate in view of a position of a brake pedal of the vehicle. Referring now to FIG. 1, in another possible feature of the invention, a third sensor 62 is disposed to sense a position of the brake pedal 64 and communicate the position of the brake pedal 64 to the controller 28. The controller can decline to emit a signal and engage the motor 20 to any shift position from the park shift position unless the brake pedal 64 is depressed.

Referring again to FIG. 7, if the desired change in shift position is appropriate in view of the position of the brake pedal, the process continues to step 76 from step 74 and the controller determines whether the desired shift position change is appropriate in view of the current shift position. For example, in a preferred embodiment of the invention, the controller would not engage the motor to shift the transmission from drive to reverse. In one possible embodiment of the invention, the controller could allow the transmission to be shifted to neutral from any of the other shift positions, at any vehicle speed or direction, in one possible embodiment of the invention.

If the desired change in shift position is appropriate in view of the position of the current shift position, the process continues to step 78 and the controller engages the motor to change the current transmission shift position. The process ends at step 80.

Figure 6:
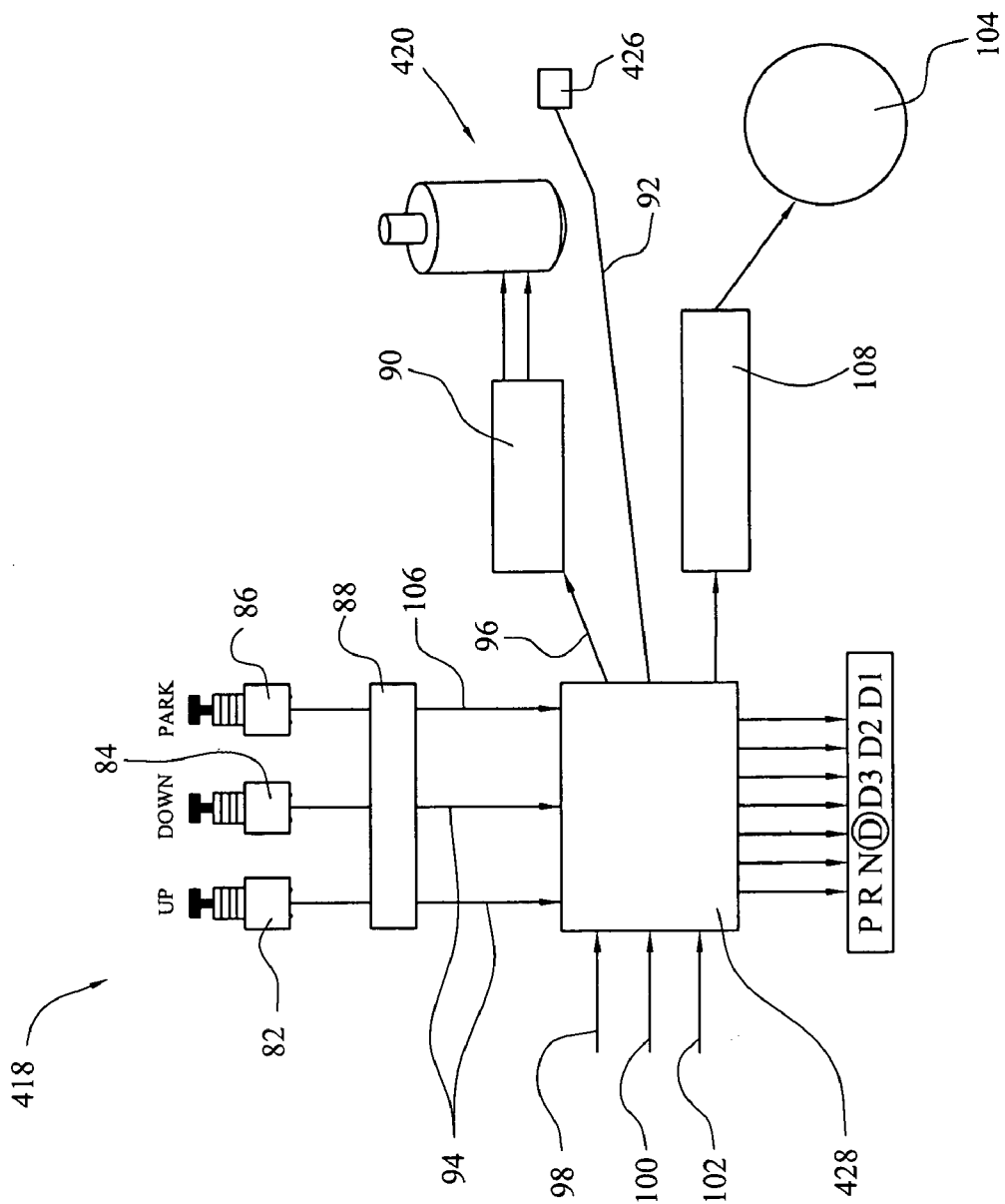
FIG. 6 is a schematic illustration of a controller according to a sixth exemplary embodiment of the invention.
Figure 8:
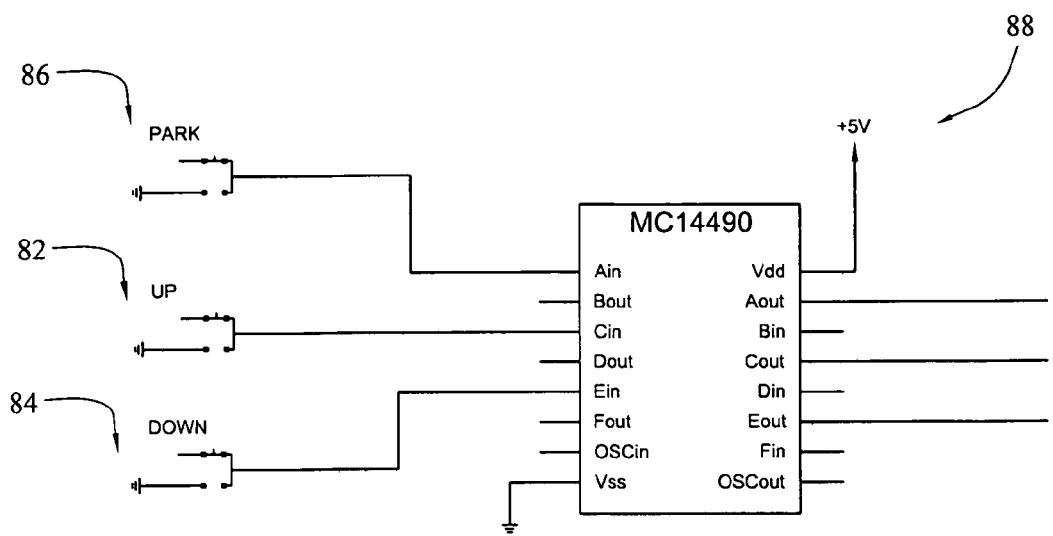
FIG. 8 is a schematic diagram of a debounce circuit according to the seventh exemplary embodiment of the invention.

FIG. 6 is a simplified schematic of an exemplary controller 428. The controller 428 communicates with a switch 418 that includes an "up" switch 82 and a "down" switch 84. A parking brake switch 86 also communicates with the controller 428. The switches 82, 84 and 86 communicate with the controller through a debounce circuit 88. The debounce circuit 88 can be defined by software such as a 10 ms delay. Alternatively, the debounce circuit 88 can be defined by an integrated chip as shown in FIG. 8.

An H-Bridge 90 is disposed between the controller 428 and the motor 420. The H-Bridge 90 can change the polarity of the motor 420 to allow the motor 420 to turn clockwise and counter-clockwise as desired. A sensor 426 is associated with the motor 420 and communicates a first signal 92 to the controller 428 corresponding to the current shift position of the transmission. The controller 428 emits a third signal 96 to the motor 420 to engage the motor 420 and change the current shift position. The controller 428 receives a second signal 94 from the switch 418 corresponding to a desired change in the shift position, a fourth signal from the second sensor 60 (shown in FIG. 1) corresponding to the direction of vehicle travel, a fifth signal from the second sensor 60 (shown in FIG. 1) corresponding to the speed of vehicle travel, and a sixth signal from the third sensor 62 (shown in FIG. 1) corresponding to the position of the brake pedal 64.

Figure 9:
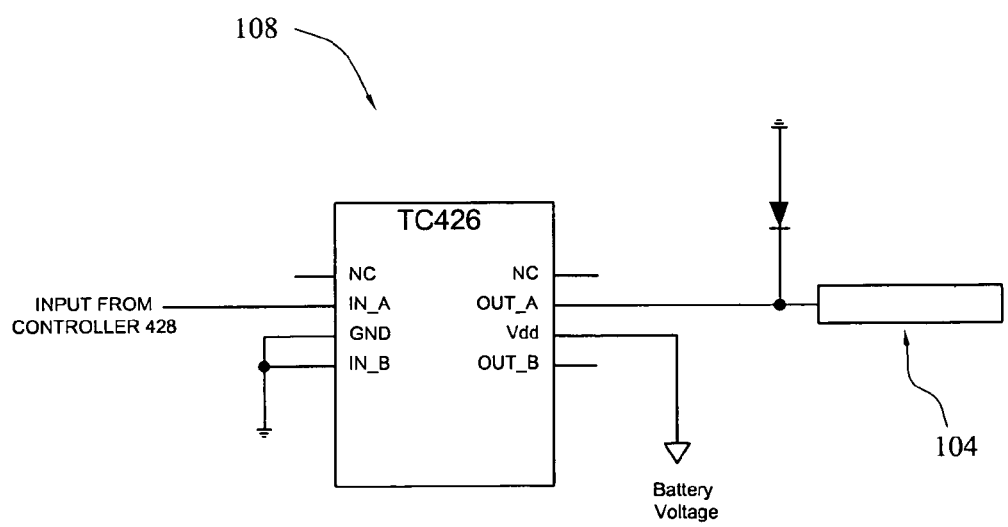
FIG. 9 is a schematic diagram of a MOSFET device according to the seventh exemplary embodiment of the invention.

The controller 428 can also selectively engage a parking brake 104 in response to a seventh signal 106 received from the parking switch 86. A MOSFET (Metal Oxide Semiconductor Field Effect Transistor) driver 108, shown in FIG. 9, is disposed between the controller 428 and the parking brake 104. When the shift position is park, a low input is applied to the MOSFET driver 108 and the solenoid is excited. An electronic park lock, or EPL, is also shown associated with the fifth exemplary embodiment of the invention shown in FIG. 5.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for shifting an automatic transmission having a shift position select lever to selectively shift the transmission to one of a plurality of different transmission shift positions, said apparatus comprising:
    a steering column positionable in a passenger compartment of a vehicle;
    a switch mountable in the passenger compartment of the vehicle and operable to emit a first signal representative of a desired change with respect to a transmission shift position;
    a motor to generate a moving force;
    a linkage associated with said motor to transmit said moving force from said motor to a shift lever of a transmission of the vehicle;
    a sensor responsive to a current transmission shift position for emitting a second signal;
    a controller responsive to said switch and said sensor for selectively controlling said motor to engage in response to said first and second signals; and characterized by
    said motor being mounted on said steering column of the vehicle;
    wherein said motor includes a rotatable member and said linkage further comprises a drive portion defined on said rotatable member and a securing member selectively operable to move in response to rotation of said rotatable member;
    wherein said linkage further comprises a link member having a first and second ends and a pivot point defined between said first and second ends, wherein at least a portion of said securing member is moveably positioned between said first end and said pivot point, wherein said link member rotates in response to movement of said securing member between said first end and said pivot point.

2. The apparatus of claim 1 including a lever arm extending from said steering column, wherein said switch is disposed on said lever arm.

3. The apparatus of claim 1 including a steering wheel disposed on said steering column, wherein said switch is disposed on said steering wheel.

4. The apparatus of claim 1 including an instrument panel extending at least partially around said steering column, wherein said switch is disposed on said instrument panel.

5. The apparatus of claim 1 wherein said linkage is further defined as including a flexible cable and said securing member is further defined as being operably associated with said flexible cable.

6. The apparatus of claim 1 wherein said linkage is further defined as including a flexible cable operably associated with said second end of said link member.

7. The apparatus of claim 1 wherein said linkage further comprises a force multiplier associated with said motor to increase said moving force.

8. The apparatus of claim 7 wherein said linkage is further defined as including a flexible cable, wherein said motor rotates said link member about said pivot point and said flexible cable being operably associated with said link member spaced from said pivot point.

9. The apparatus of claim 1 wherein said sensor is further defined as being spaced from said motor.

10. The apparatus of claim 1 wherein said sensor is further defined as being operably associated with said motor.

11. The apparatus of claim 1 wherein said controller is further defined as being operable to receive said first signal from said switch and maintain disengagement of said motor.

12. The apparatus of claim 11 wherein said controller is further defined as being operable to maintain disengagement of said motor after receiving said first signal in response to said second signal.

13. A method comprising the steps of:
    controlling a transmission of a vehicle to define a plurality of different shift positions with a controller disposed in communication with a switch and a motor, wherein the motor is associated with the transmission and the shift positions include park, neutral, reverse, and drive;
    mounting the motor on a steering column of the vehicle;
    providing the motor with a rotatable member operably associated with a linkage, wherein the linkage comprises a drive portion defined on the rotatable member and a securing member selectively operable to move in response to rotation of the rotatable member; and
    providing the linkage with a link member having a first and second ends and a pivot point defined between the first and second ends, the at least a portion of the securing member being moveably positioned between the first end and the pivot point, the link member rotating in response to movement of the securing member between the first end and the pivot point.

14. The method of claim 13 further comprising the steps of:
    sensing a current shift position of the transmission with a first sensor; and
    communicating a first signal corresponding to the current shift position to the controller from the first sensor.

15. The method of claim 14 further comprising the steps of:
    communicating a second signal corresponding to a desired change with respect to the current shift position to the controller from the switch;
    comparing the first and second signals with the controller; and
    selectively emitting a third signal to engage the motor for changing the shift position of the transmission.

16. The method of claim 15 wherein the selectively emitting step includes the step of:
    emitting the third signal when the second signal corresponds to the neutral shift position and when the first signal corresponds to any of the other shift positions.

17. The method of claim 15 including the step of:
sensing a vehicle velocity with a second sensor wherein the vehicle velocity includes a direction component and speed component; and
emitting a fourth signal corresponding the direction component to the controller and a fifth signal corresponding to the speed component to the controller with the second sensor.

18. The method of claim 17 wherein the selectively emitting step includes the step of:
maintaining the current shift position by declining to emit the third signal to the motor from the controller when the fourth signal corresponds to a reverse direction of vehicle travel and the second signal corresponds to the drive shift position.

19. The method of claim 17 wherein the selectively emitting step includes the step of:
maintaining the current shift position by declining to emit the third signal to the motor from the controller when the fourth signal corresponds to a forward direction of vehicle travel and the second signal corresponds to the reverse shift position.

20. The method of claim 17 wherein the selectively emitting step includes the step of:
maintaining the current shift position by declining to emit the third signal to the motor from the controller in response to the fifth signal and the first signal.

21. The method of claim 17 including the steps of:
sensing a position of a brake pedal with a third sensor;
communicating a sixth signal corresponding to the position of the brake pedal from the third sensor to the controller; and
wherein the selectively emitting step includes the step of maintaining the current shift position by declining to emit the third signal to the motor from the controller in response to the sixth signal.

22. An apparatus for shifting an automatic transmission having a shift position select lever to selectively shift the transmission to one of a plurality of different transmission shift positions, said apparatus comprising:
a steering column positionable in a passenger compartment of a vehicle;
a switch mountable in the passenger compartment of the vehicle and operable to emit a first signal representative of a desired change with respect to a transmission shift position;
a motor to generate a moving force;
a linkage associated with said motor to transmit said moving force from said motor to a shift lever of a transmission of the vehicle;
a sensor responsive to a current transmission shift position for emitting a second signal;
a controller responsive to said switch and said sensor for selectively controlling said motor to engage in response to said first and second signals; and characterized by
said motor being mounted on said steering column of the vehicle;
wherein said motor includes a rotatable shaft and said linkage further comprises a screw drive defined on said shaft and a nut moved in translation in response to rotation of said shaft;
wherein said linkage further comprises a link bar having a first and second ends and a pivot point defined between said first and second ends and a slot defined between said first end and said pivot point, wherein at least a portion of said nut is moveably positioned in said slot and said link bar rotates in response to translation of said nut.

23. The apparatus of claim 22 including a lever arm extending from said steering column, wherein said switch is disposed on said lever arm.

24. The apparatus of claim 22 including a steering wheel disposed on said steering column, wherein said switch is disposed on said steering wheel.

25. The apparatus of claim 22 including an instrument panel extending at least partially around said steering column, wherein said switch is disposed on said instrument panel.

26. The apparatus of claim 22 wherein said sensor is further defined as being spaced from said motor.

27. The apparatus of claim 22 wherein said sensor is further defined as being operably associated with said motor.

28. The apparatus of claim 22 wherein said controller is further defined as being operable to receive said first signal from said switch and maintain disengagement of said motor.

29. The apparatus of claim 28 wherein said controller is further defined as being operable to maintain disengagement of said motor after receiving said first signal in response to said second signal.

* * * * *